(12) United States Patent
Handa et al.

(10) Patent No.: US 8,269,903 B2
(45) Date of Patent: Sep. 18, 2012

(54) DISPLAY PANEL DRIVE APPARATUS

(75) Inventors: Hiroto Handa, Tokyo (JP); Tetsuya Suzuki, Tokyo (JP); Akira Takahashi, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 762 days.

(21) Appl. No.: 11/571,223

(22) PCT Filed: Jun. 29, 2005

(86) PCT No.: PCT/JP2005/011935
§ 371 (c)(1),
(2), (4) Date: Feb. 27, 2008

(87) PCT Pub. No.: WO2006/003929
PCT Pub. Date: Jan. 12, 2006

(65) Prior Publication Data
US 2010/0059643 A1 Mar. 11, 2010

(30) Foreign Application Priority Data

Jun. 30, 2004 (JP) ................................ 2004-192705
Jun. 30, 2004 (JP) ................................ 2004-192707

(51) Int. Cl.
*B60K 35/00* (2006.01)
*B60R 11/02* (2006.01)
(52) U.S. Cl. ........................... 348/837; 348/836; 296/70
(58) Field of Classification Search ................ 52/64, 66, 52/69; 49/341–343; 296/1.09, 24.1, 24.34, 296/37.12, 37.13, 64, 65.01, 65.09, 65.17, 296/69, 70, 191; 348/837, 836; 345/156
See application file for complete search history.

(56) References Cited

U.S. PATENT DOCUMENTS

| 1,941,454 | A | * | 1/1934 | Ainsworth | 49/340 |
| 4,266,371 | A | * | 5/1981 | Erdman et al. | 49/342 |
| 4,796,370 | A | * | 1/1989 | Chang | 40/450 |
| 5,564,585 | A | * | 10/1996 | Saitoh | 312/257.1 |
| 5,754,017 | A | * | 5/1998 | Tsuge et al. | 49/28 |
| 5,941,615 | A | * | 8/1999 | Ito et al. | 312/7.2 |

FOREIGN PATENT DOCUMENTS

| DE | 101 20 314 | 3/2002 |
| EP | 0 551 078 | 1/1993 |
| EP | 1 020 329 | 7/2000 |
| JP | 4005142 | 1/1992 |
| JP | 09-230798 | 9/1997 |
| JP | 11-007337 | 1/1999 |
| JP | 11034753 | 2/1999 |

(Continued)

*Primary Examiner* — Basil Katcheves
*Assistant Examiner* — Matthew J Smith

(57) ABSTRACT

A panel drive apparatus that requires no special mechanism inside a device body and that can be easily mounted on the device body.

One end of an arm 330 is rotatably joined to a mounting plate 310 that can be mounted on the device. The other end of the arm 330 is rotatably joined to a panel 100. The mounting plate 310 has a fan-shaped fixed gear 320. A panel gear 350, which is a spur gear, is fixed to the panel 100. The arm 330 has an idle gear 340 that is provided between the fixed gear 320 and panel gear 350 so as to be engaged with the respective gears and that can be rotated by a drive mechanism 200.

18 Claims, 11 Drawing Sheets

FOREIGN PATENT DOCUMENTS

| | | |
|---|---|---|
| JP | 2000-253333 | 9/2000 |
| JP | 2010057067 | 2/2001 |
| JP | 2001088620 | 4/2001 |
| JP | 2001-201368 | 7/2001 |
| JP | 2001202764 | 7/2001 |
| JP | 2002074923 | 3/2002 |
| JP | 2002-101362 | 4/2002 |
| JP | 2002-234398 | 8/2002 |
| JP | 2003069920 | 3/2003 |
| JP | 2003-133751 | 5/2003 |

* cited by examiner

DISPLAY PANEL DRIVE APPARATUS

TECHNICAL FIELD

The present invention relates to a technology of driving a panel comprising a display device such as an electronic device, and more particularly to a panel drive apparatus with improved mechanism for changing a panel angle.

BACKGROUND ART

A transition to multifunctional electronic devices for vehicles has been advanced in recent years, and recording media that can be used therein expanded beyond those for audio applications such as CD or MD to media for video applications such as DVD and CD-ROM. At the same time, electronic devices for vehicles comprising comparatively large display units that differ from the conventional display devices, which serve only as functional displays, and enable the displays of various types such as images for navigation and TV and DVD images have become widespread.

Due to space limitations inside a vehicle cabin, such display units of electronic devices for vehicles are most often provided on a panel that can be opened and closed at the front surface of the electronic device (Japanese Patent Application Laid-open No. 2001-57067). When the panel is upright and closed, the insertion slot for a recording medium that is formed on the front surface of the electronic device is covered and hidden, and when the panel is an a horizontal and open state, the insertion slot is exposed and the recording medium can be inserted therein and removed therefrom. Furthermore, technologies described in Japanese Patent Applications Laid-open No. 2002-74923 and 2003-69920 have been suggested as specific means for opening and closing the panel.

DISCLOSURE OF THE INVENTION

However, the mechanism for opening and closing the panel in the above-described electronic devices is provided on the electronic device body and a large space is required therefor inside the body. In particular, not only when a long rack or arm is used, as described in Japanese Patent Applications Laid-open No. 2003-69920, but also when a panel is accommodated inside the body, as described in Japanese Patent Applications Laid-open No. 2002-74923, even larger space is required. Furthermore, if a mechanism for opening and closing the panel is thus provided inside the body, the operation of mounting the panel on the body in the manufacturing process is extremely troublesome, thereby impeding the efficient production.

To resolve this problem a closing-opening mechanism can be provided on the panel. But the panel itself is required to be thin in electronic devices. For this reason, it is difficult to provide the panel with a mechanism that will have multiple functions of not only opening and closing the panel, but also adjusting the angle thereof.

The present invention was created to resolve the above-described problems inherent to prior art technology, and it is an object of the present invention to provide a panel drive apparatus that does not require a special mechanism to be provided in the device body and facilitates the operation of mounting on the device body.

In order to attain the aforementioned object, the present invention provides a panel drive apparatus comprising a mounting unit that can be mounted on a device, a panel provided displaceably with respect to the mounting unit, and a drive unit that displaces the panel, wherein one end of an arm section is rotatably joined to the mounting unit, the other end of the arm section is rotatably joined to the panel, the mounting unit comprises a fixed gear having at least a circular-arc gear section, a panel gear having at least a circular-arc gear section is fixed to the panel, and the arm section has an idle gear that is provided between the fixed gear and the panel gear so as to be engaged with the respective gears and that can be rotated by the drive unit.

In the above-described invention, the entire mechanism for driving the panel is configured on the panel independently of the device on which the panel is to be mounted. Therefore, no special mechanism is necessary on the device side. As a result, the internal space of the device can be used effectively and the entire device with the panel mounted thereon can be reduced in size. Furthermore, mounting of the panel on the device can be accomplished by mounting the mounting unit on the device. Therefore, no efforts are spent on joining or connecting to the internal structure of the device. As a result, the manufacturing process is greatly simplified, production efficiency and quality are improved, and cost is reduced.

In another aspect, the arm section, fixed gear, panel gear, and idle gear are provided in pairs above and below the panel or on the left and right side thereof.

In this aspect, because the components constituting the mechanism for driving the panel are provided in pairs above and below the panel or on the left and right side thereof, the operation of the panel is stabilized.

In another aspect, the drive unit comprises a drive source, detection means for detecting at least one of a displacement amount or a displacement end of the panel, and a control unit for controlling the drive source according to a detection signal of the detection means.

In this aspect, the displacement amount or displacement end of the panel can be automatically controlled by stopping or actuating the drive source in response to the detection by the detection means.

In another aspect, the drive unit comprises a drive source, a joining gear unit that transmits a drive force of the drive unit to the idle gear, and a clutch mechanism that is provided between the drive source and the joining gear unit, transmits the drive force of the drive source to the joining gear unit, and disconnects the transmission of the drive force from the drive source to the joining gear unit when a force acting against the drive force is applied to the joining gear unit.

In this aspect, the transmission of the drive force between the drive source and the joining gear unit is disconnected by the clutch mechanism even when a force acting against the displacement is applied, for example, by the user touching the panel as the panel is being displaced. Therefore, deterioration of mechanical contact components such as gears and load application to the drive source can be prevented.

In another aspect, the panel comprises a display device, the drive unit has a drive mechanism comprising a drive source and a plurality of gears driven by the drive source, the drive mechanism is incorporated at the rear surface side of the display device in the panel, the plurality of gears include a position detection gear for detecting the rotation amount or rotation end thereof and a clutch mechanism gear for connecting and disconnecting the drive force of the drive source, and large-diameter sections of the position detection gear and the clutch mechanism gear are arranged parallel to the display surface of the display device.

In this aspect, the position detection gear and clutch mechanism gear may easily have comparatively large diameter, but because all the large-diameter sections thereof are arranged parallel to the display surface of the display device, a large number of functions can be incorporated, while maintaining a small thickness of the panel. Therefore, it is not necessary to provide a drive mechanism including multiple functions at the device body, the internal space of the device can be used effectively, and the entire device with the panel attached thereto can be reduced in size.

In another aspect, the panel drive apparatus comprises a joining gear unit for transmitting a drive force between any of the drive source, position detection gear, and the clutch mechanism gear, and a shaft of the joining gear unit is arranged parallel to the display surface of the display device.

In this aspect, the joining gear unit that joins the gears is comparatively long, but because the shaft thereof is installed parallel to the display surface of the display device, a small panel thickness can be maintained.

In another aspect, the panel drive apparatus comprises an angle adjustment mechanism having a plurality of gears driven by the drive mechanism and a mounting unit that can be mounted on a device.

In the above-described aspects because both the drive mechanism and the angle adjustment mechanism are provided at the panel, the internal space of the device is nor required and joining or connection to the mechanisms located inside the device in the manufacturing process requires no efforts. Therefore, the manufacturing process can be greatly simplified, the production efficiency and quality are improved, and cost is reduced.

According to the present invention as described above, it is possible to provide a panel drive apparatus that requires no special mechanism inside a device body and that can be easily mounted on the device body.

BEST MODE FOR CARRYING OUT THE INVENTION

An embodiment of the panel drive apparatus for a vehicle that employs the present invention (referred to hereinbelow as "present embodiment") will be described below in greater detail with reference to the appended drawings. In the explanation hereinbelow, the state in which the panel is upright will be considered as a standard state, the front surface side and the rear surface side will be taken as front and rear, and the up-down and left-right directions will be considered to correspond to the directions observed in viewing the panel from the front surface side thereof.

A. Entire Configuration

Figure 1:
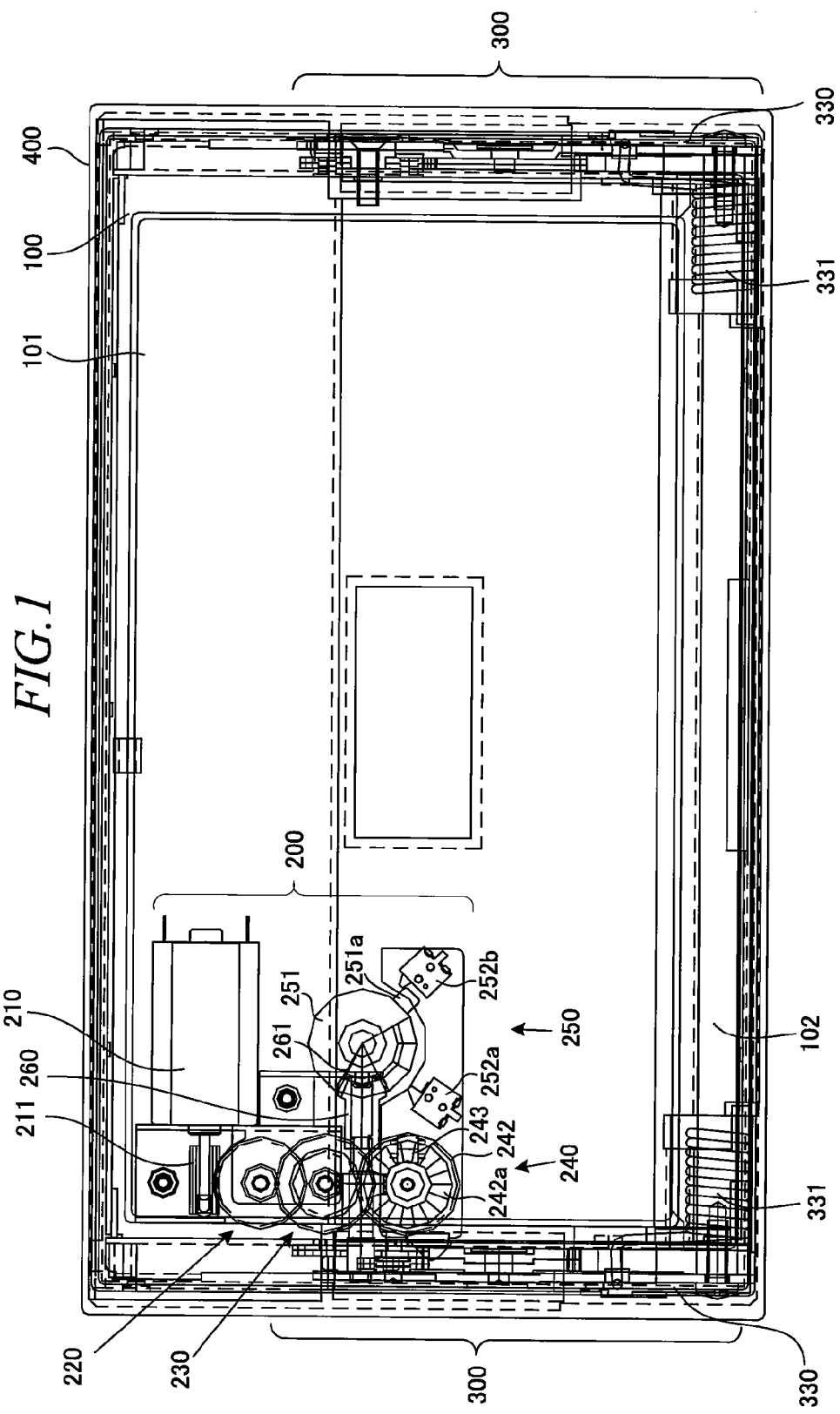
FIG. 1 is a front transparent view illustrating an embodiment of the panel drive apparatus in accordance with the present invention.
Figure 2:
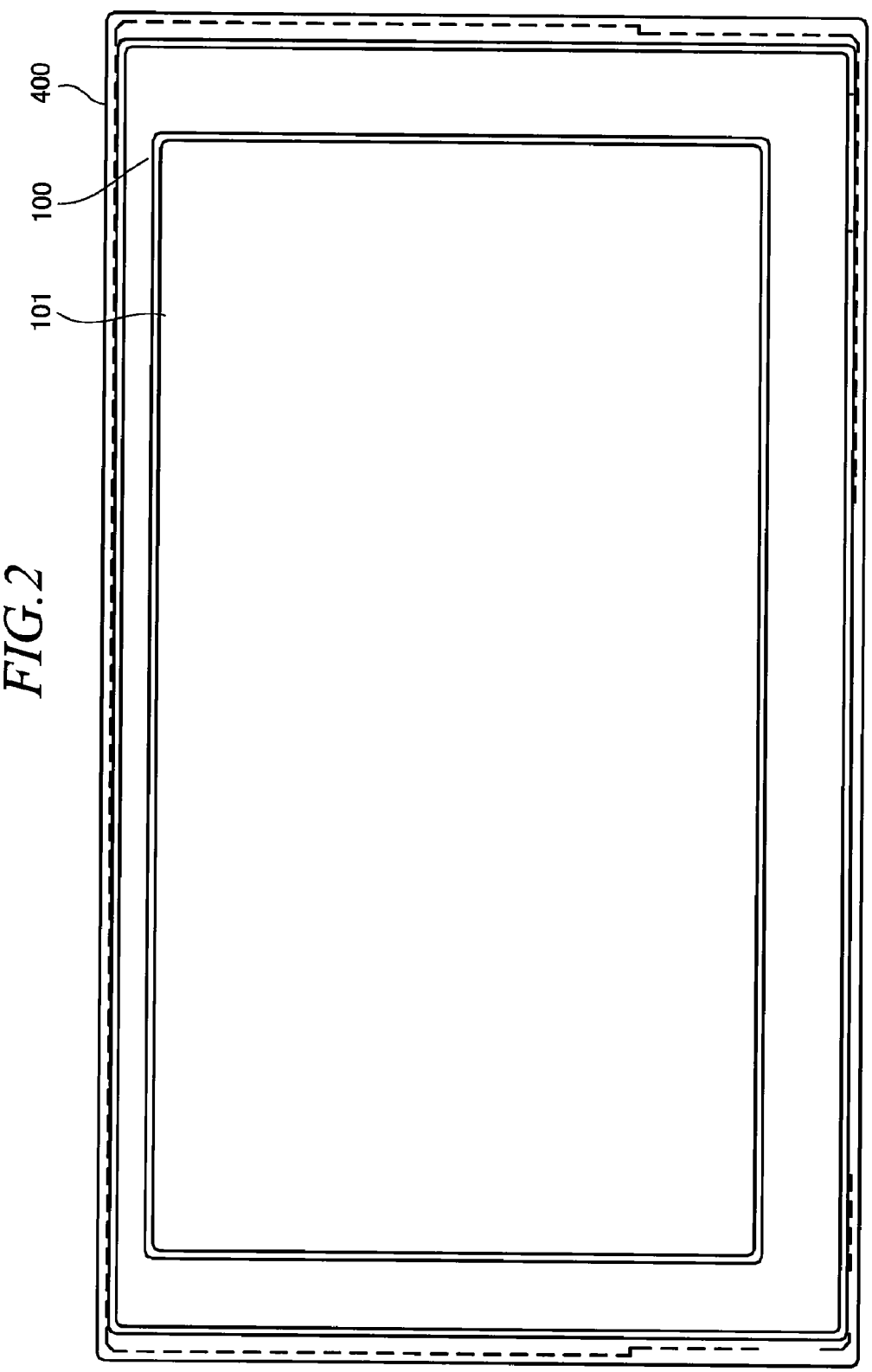
FIG. 2 is a front view illustrating a panel and display device of the embodiment shown in FIG. 1.

As shown in FIG. 1 and FIG. 2, the present embodiment has the following general configuration.

(1) A panel 100 comprising a display device 101.

(2) A drive mechanism 200 incorporated in the rear section of the panel 100.

(3) An angle adjustment mechanism 300 incorporated in the side section of the panel 100.

(4) A body 400 of an electronic device for a vehicle having the panel 100 mounted thereon.

B. Configuration of Components

1. Panel (FIG. 1, FIG. 2)

The panel 100, as shown in FIG. 1, is a rectangular member comprising a display device 101 such as a liquid crystal display device on the front surface side. The drive mechanism 200 is incorporated on the rear side of the display device 101 in the panel 100. Furthermore, angle adjustment mechanisms 300 for changing the angle of the panel 100 when driven by the drive mechanism 200 are incorporated on the left and right side of the panel 100.

2. Drive Mechanism (FIG. 1, FIG. 3, and FIG. 4)

Figure 3:
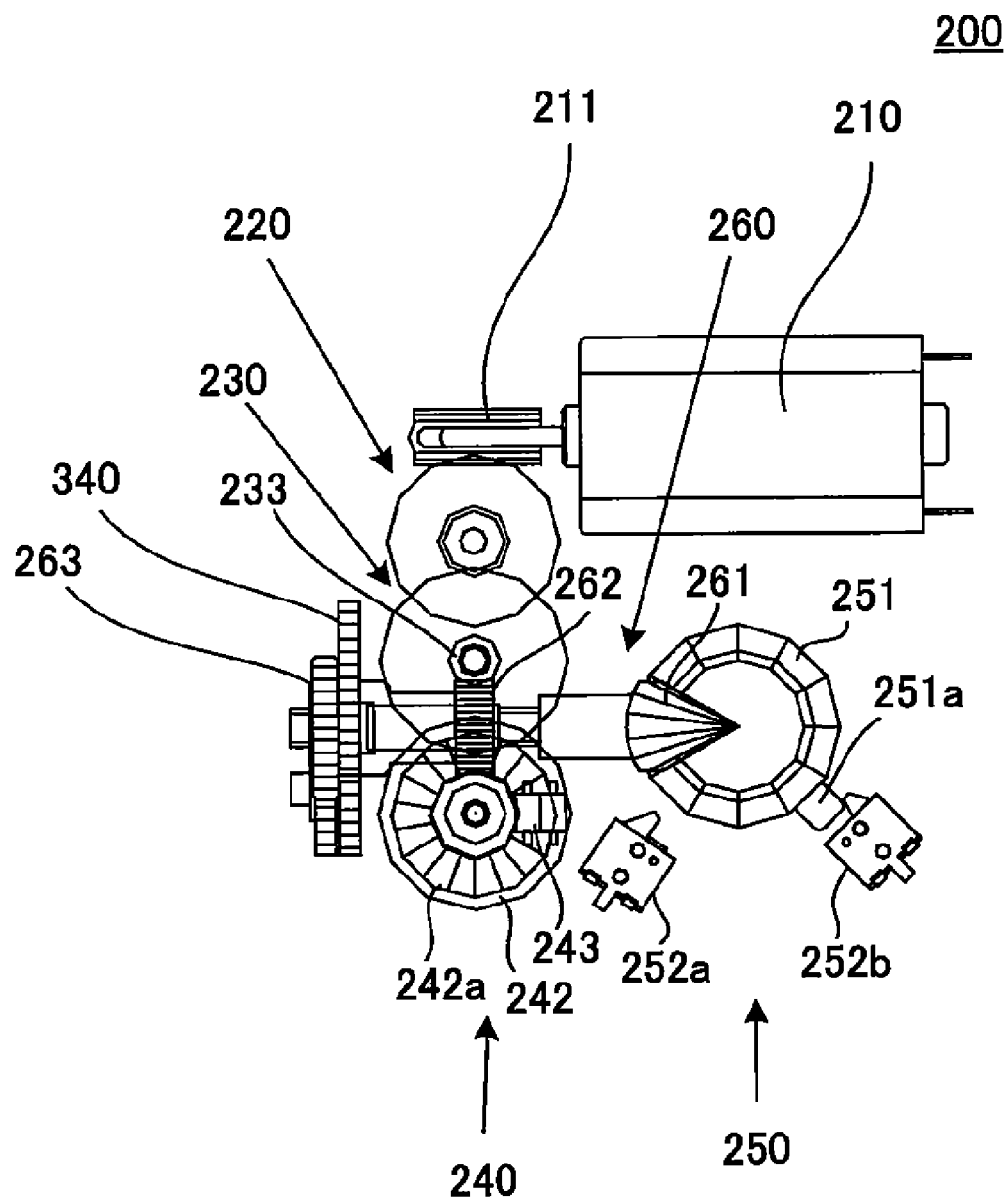
FIG. 3 is a front view illustrating a drive mechanism of the embodiment shown in FIG. 1.

The drive mechanism 200, as shown in FIG. 1 and FIG. 3, comprises a motor 210, a clutch 220, a multistage gear 230, and angle detection unit 240, a rotation end detection unit 250, and a joining gear unit 260. The motor 210 is installed close to the upper left corner of the panel 100 so that the motor shaft is oriented in the horizontal direction parallel to the display device 101. A worm 211 is mounted on the shaft of the motor 210, so that the drive force of the motor 210 is transferred to the clutch 220.

2-1. Clutch

Figure 4:
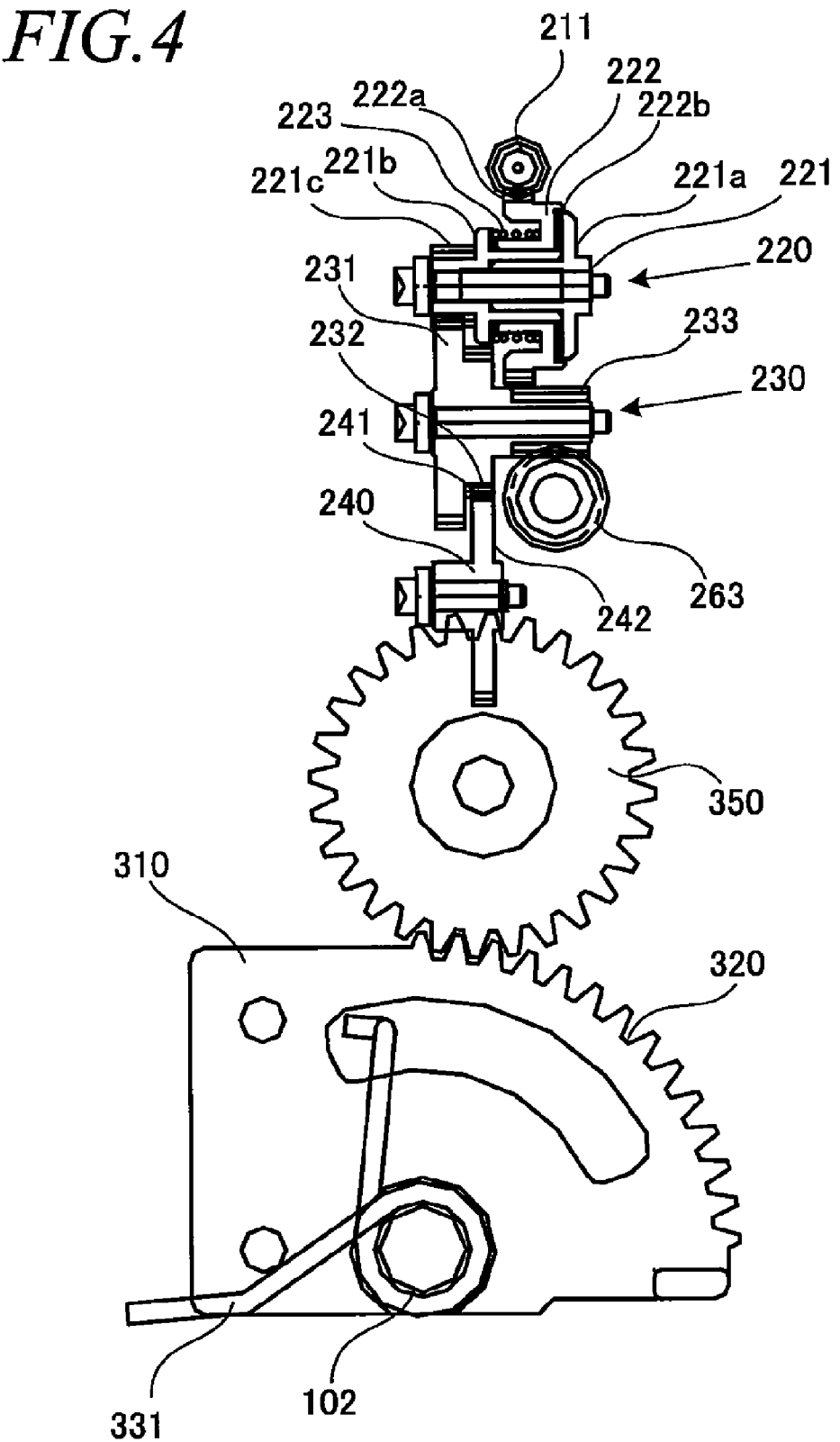
FIG. 4 is a side view illustrating part of the drive mechanism and angle adjustment mechanism of the embodiment shown in FIG. 1.

As shown in FIG. 4, the clutch 220 is configured of a reel unit 221 provided so that it can rotate about a shaft in the direction perpendicular to the display device 101, and a slide gear 222 provided so that it can rotate about the same shaft as the reel unit 221. A flange 221a is provided in front and a flange 221b is provided behind the reel unit 221. A pinion 221c for transferring the drive force to the multistage gear 230 is formed behind the flange 221b. The slide gear 222 is disposed between the flanges 221a, 221b, and a gear groove 222a, which is a worm wheel engaged with the worm 211 of the motor 210, is formed on the circumference of the slide gear.

A spacer 222b having a lubricating ability is provided between a front surface of the slide gear 222 and the inner surface of the flange 221a of the reel unit 221. A spring 223 is installed between the inner surface of the rear flange 221b and the slide gear 222, and the slide gear 222 is pressed against the front flange 221a via the spacer 222b. Therefore, the configuration is such that the reel unit 221 usually rotates together with the slide gear 222. However, if a user applies a force that stops the rotation on the side of the reel unit 221, for example, by touching the panel 100 when the panel rotates, the spacer 222b will slide on the inner side of the flange 221a together with the rotation of the slide gear 222, thereby rotating independently of the reel unit 221.

2-2. Multistage Gear

The multistage gear 230, as shown in FIG. 4, is obtained by forming integrally a large-diameter section 213, which is a large-diameter spur gear, a small-diameter section 232, which is a small-diameter spur gear, and a worm 233 and provided so that it can rotate about an axis parallel to the clutch 220. The large-diameter section 231 is engaged with the pinion 221c of the clutch 220. As will be described below, the small-diameter section 232 transfers the drive force to the angle detection unit 240, and the worm 233 transfers the drive force to the joining gear unit 260.

2-3. Angle Detection Unit

The angle detection unit 240, as shown in FIG. 3 and FIG. 4, comprises a disk section 242 and a sensor 243. The disk section 242 is provided so that it can rotate about an axis parallel to the multistage gear 230, and a gear section 241 of a spur gear that engages with the small-diameter section 232 of the multistage gear 230 is formed on the circumference of the disk section 242. Radial reflecting sections 242a are formed equidistantly on the front surface of the disk section 242. The sensor 243 is a reflection-type photo interrupter and can detect the rotation angle of the disk section 242 by detecting the presence or absence of reflection of the light emitted by a light-emitting diode from the reflection sections 242a. The sensor 243 is fixed to the panel 100 or to a mounting plate that is fixed to the panel 100.

2-4. Rotation End Detection Unit

The rotation end detection unit 250, as shown in FIG. 1 and FIG. 3, comprises a gear section 251, which is a bevel gear for transferring the drive force from the joining gear unit 260, and switches 252a, 252b for detecting the upper limit and lower limit of rotation of the gear unit 251. A protruding piece 251a that protrudes from the outer periphery of the gear unit 251 is formed at the gear unit, and the switches 252a, 252b are disposed in the positions where the rotation end of the gear 251 can be detected by coming into contact with the protruding piece 251a. The switches 252a, 252b are fixed to the panel 100 or to a mounting plate that is fixed to the panel 100.

2-5. Joining Gear Unit

Figure 5:
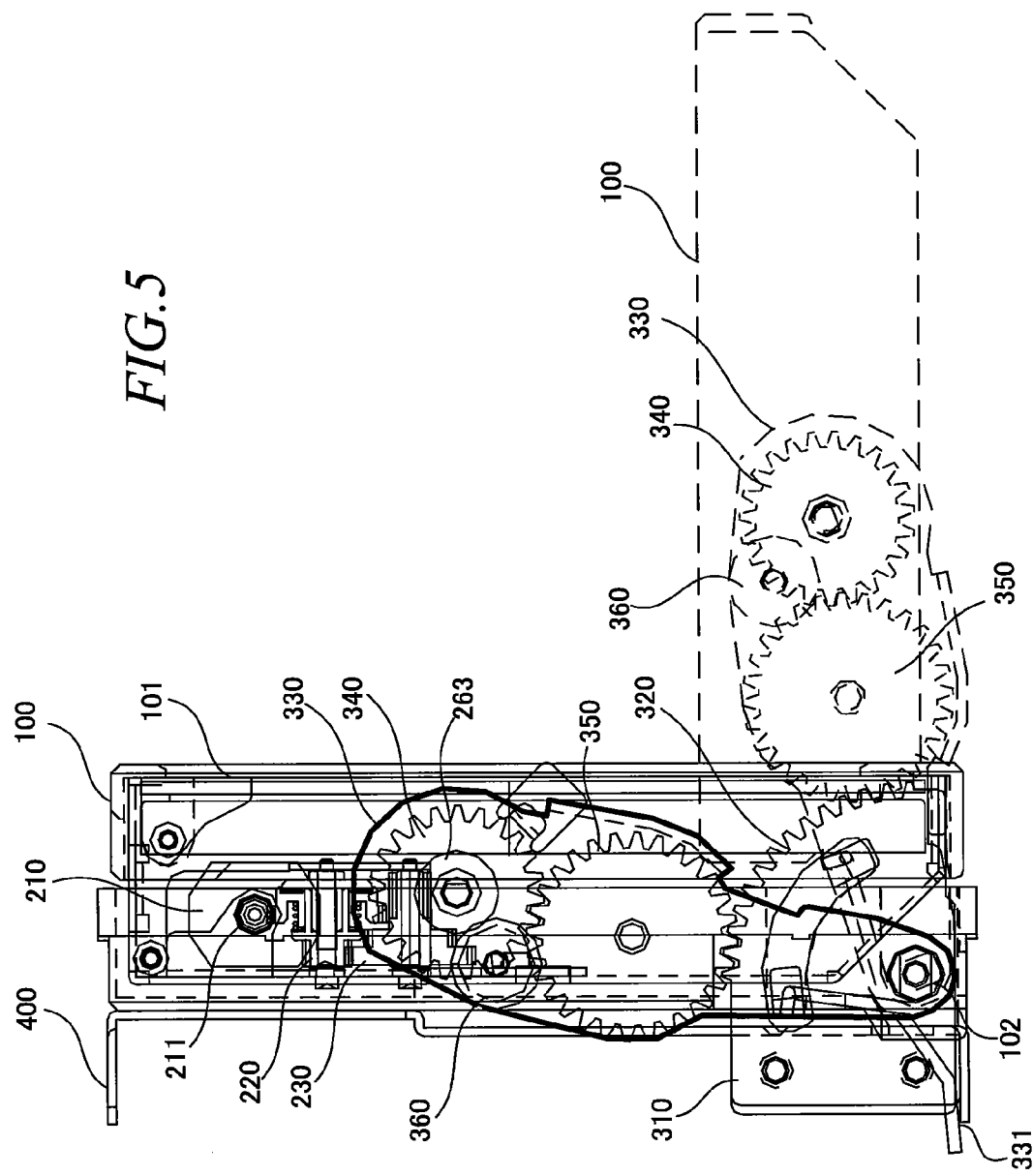
FIG. 5 is a left side transparent view of the panel of the embodiment shown in FIG. 1.

The joining gear unit 260, as shown in FIG. 1 and FIG. 3, has a plurality of gears on a shaft provided horizontally and parallel to the display device 101 of the panel 100. Thus, a right-end gear 261, which is a bevel gear engaged with the gear section 251 of the rotation eng detection unit 250, is provided at the right end of the joining gear unit 260. An intermediate gear 262, which is a worm wheel engaged with the worm 233 of the multistage gear 230, is provided in the intermediate section of the joining gear unit 260. The left end section of the joining gear unit 260 protrudes from the center of the below-described panel gear 340 and, as shown in FIG. 3 and FIG. 5, a left-end gear 263 for transferring a drive force to the angle adjustment mechanism 300, is provided at the left end section.

2-6. Arrangement of Gears of Drive Mechanism

In the above-described drive mechanism 200, all the members with a comparatively large diameter such as the slide gear 222 of the clutch 220, the large-diameter section 231 of the multistage gear 230, the gear section 241 and disk section 242 of the angle detection unit 240, and the gear section 251 of the rotation end detection unit 250 are arranged by planes thereof in the direction parallel to the display surface of the display device 101 (axis are in the directions perpendicular to the display device 101). Furthermore, comparatively long members such as the motor 210 and joining gear unit 260 are arranged so that the axis thereof are in the direction parallel to the display device 101. Therefore, all the functions are accommodated in a thin space at the rear surface of the display device 101 in the panel 100.

3. Angle Adjustment Mechanism (FIG. 4, FIG. 5, and FIG. 6)

The angle adjustment mechanism 300, as shown in FIG. 5, comprises a mounting plate 310, a fixed gear 320, an arm 330, a panel gear 340, an idle gear 350, and a transmission gear 360. The mounting plate 310, as shown in FIG. 5 (left side of the panel) and FIG. 6 (right side of the panel), is fixed to the left and right sides of the front surface of the body 400. A plurality of insertion slots (not shown in the figures) for recording media are provided in the front surface of the body 400.

Figure 6:
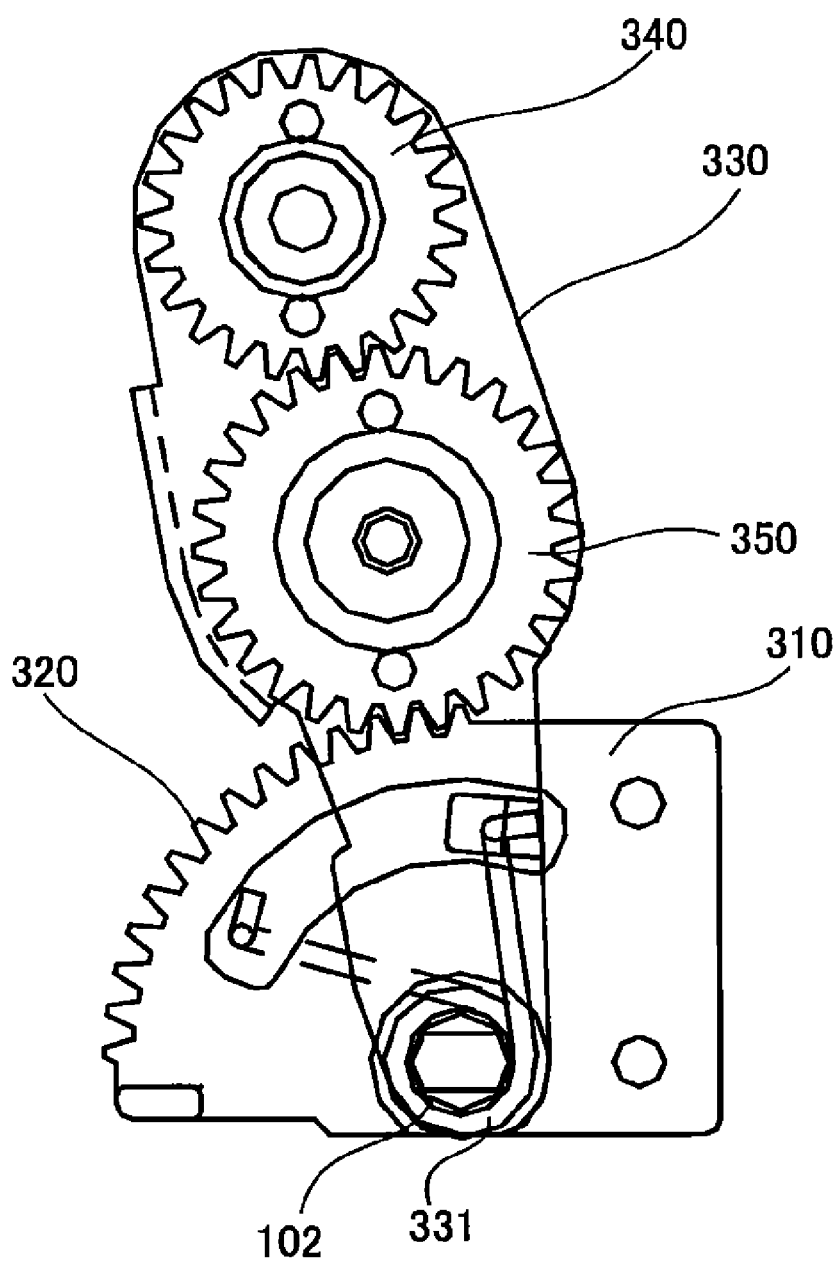
FIG. 6 is a right side view of the angle adjustment mechanism of the embodiment shown in FIG. 1.
Figure 7:
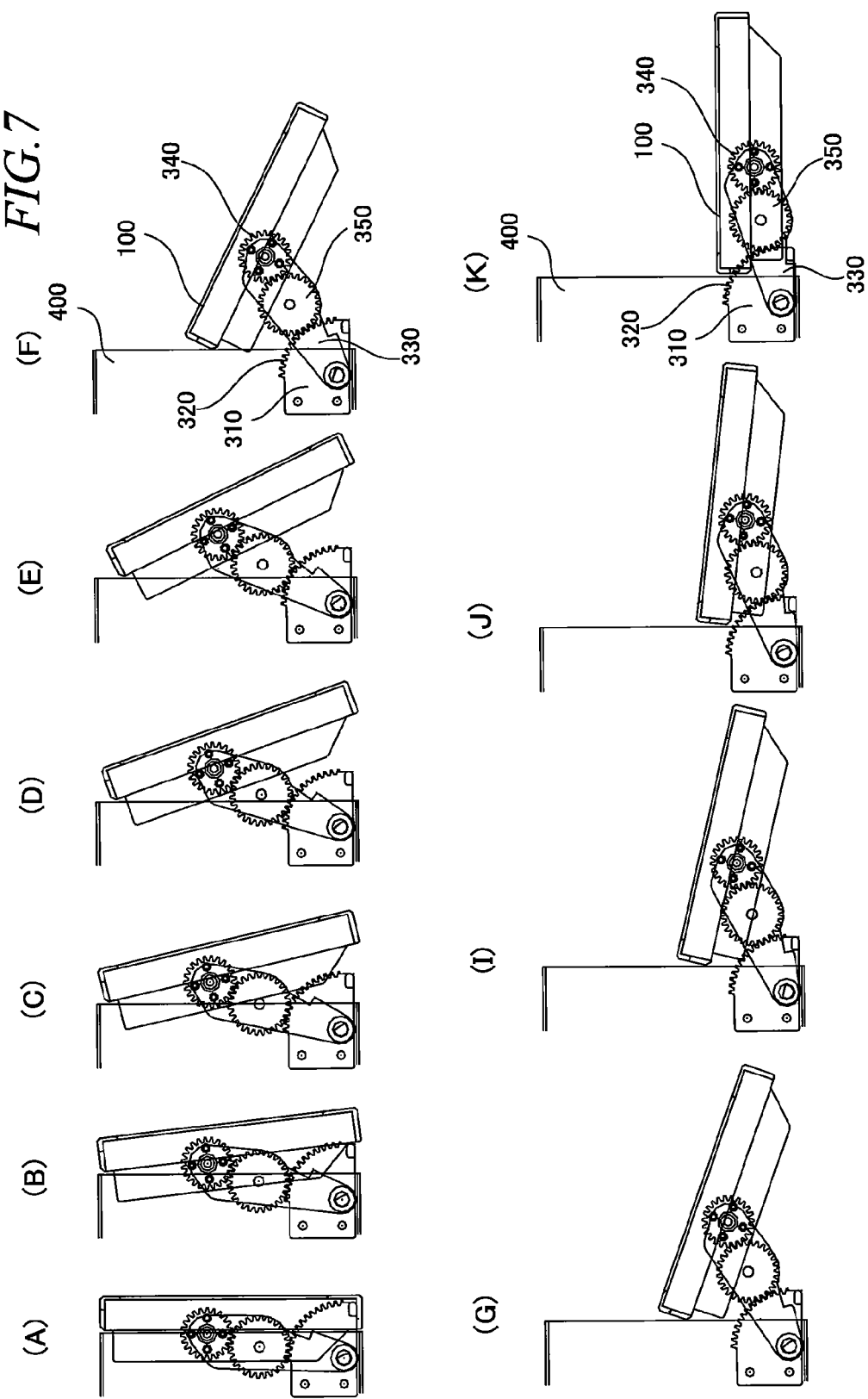
FIG. 7 is a side view illustrating the rotation of the panel in the embodiment shown in FIG. 1.

The fixed gear 320, as shown in FIG. 5 and FIG. 6, is a fan-shaped circular-arc gear provided at the left and right mounting plates 310. The fixed gear 320 may be formed integrally with the mounting plate 310 or may be formed separately and then fixed to the mounting plate. The arm 330 is mounted by the lower end thereof so that the arm can rotate about the center (apex of the fan-shaped rectangular portion) of the fixed gear 320 in the left and right mounting plates 310. On the other hand, the upper end of the arm 330 is rotatably mounted on the left and right side of the panel 100. Furthermore, a panel gear 340, which is a spur gear, is fixed to the panel 100 and has the same axis as the rotation shaft of the upper end of the arm 330. The idle gear 350, which is a spur gear, is rotatably mounted on the central zone of the arm 330. This idle gear 350 is engaged by the lower section thereof with the fixed gear 320 and by the upper section thereof with the panel gear 340.

Furthermore, as shown in FIG. 5, an end section of the joining gear unit 260 protrudes, as mentioned hereinabove, from the center of the panel gear 340 on the left side of the panel 100, and a left-end gear 263, which rotates independently of the panel gear 340, is provided at this protruding end section. A transmission gear 360, which is a spur gear engaged with the idle gear 350, is rotatably provided in the vicinity of the idle gear 350 of the arm 330 on the left side of the panel 100. Because this transmission gear 360 is engaged with the left-end gear 263 of the drive mechanism 200, the drive force of the joining gear unit 260 is transmitted to the idle gear 350 via the transmission gear 360.

Furthermore, as shown in FIG. 5 and FIG. 6, the left and right arms 330 are forced to assume an initial upright state by the respective torsion springs 331. The torsion spring 331 is supported by inserting a horizontal shaft 102 provided between the mounting plates 310 into the coil section.

4. Control Unit

The operation of the motor 210 is controlled by a control unit based on input manipulation from a variety of input means such as a switch provided on the panel 100, a touch panel of the display device 101, an external remote control, detection signals from the sensor 243 of the angle detection unit 240, detection signals from the switches 252a, 252b of the rotation end detection unit 250, and the like. The control unit is realized, for example, with a special electronic circuitry or with a computer operated by a predetermined program. Therefore, a computer program for controlling the operation of the apparatus according to the procedure described hereinbelow and a recording medium where the computer program is recorded are also the modes of the present invention.

c. Operation

The operation of the above-described present embodiment will be described hereinbelow with reference to the above-described structural drawings and operation diagrams shown in FIGS. 7 to 10.

1. Operation of Tilting the Panel

Figure 8:
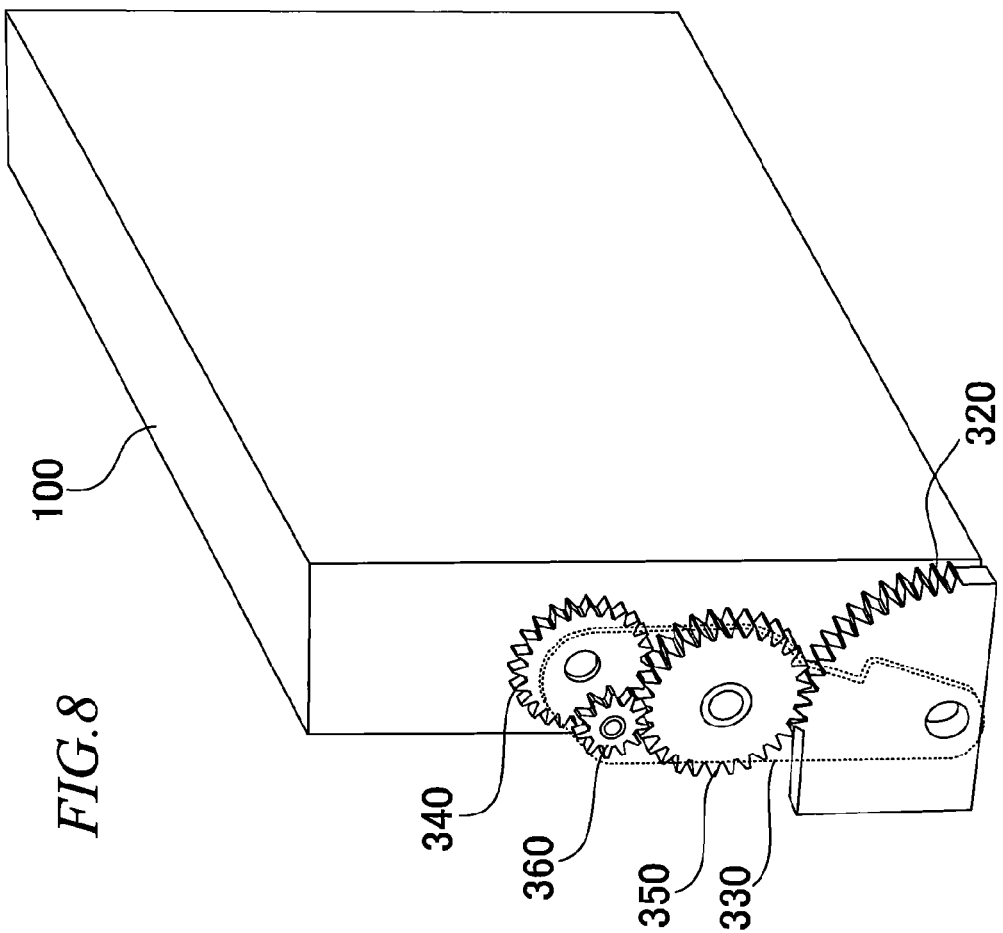
FIG. 8 is a perspective view illustrating the upright state of the panel in the embodiment shown in FIG. 1.

In the initial state, as shown in FIG. 7(A) and FIG. 8, the panel 100 is in an upright state, and the display device 101 thereof faces the front surface side. If an input means is operated in this state to expose the insertion slot provided at the front surface of the body 400, as shown in FIG. 3 and FIG. 4, the motor 210 is actuated and the slide gear 222 and reel unit 221 of the clutch 220 are rotated (FIG. 3 and FIG. 4). As a result, the multistage gear 230 is also rotated and the left-end gear 263 of the joining gear unit 260 is rotated clockwise (as seen in FIG. 4 and FIG. 5).

As a result, the transmission gear 360 that is engaged with the left-end gear 263 rotates counterclockwise (see FIG. 5). Therefore, the idle gear 350 that is engaged with the transmission gear 360 starts rotating clockwise. Because the idle gear 350 is engaged with the fan-shaped fixed gear 320 that is fixed to the mounting plate 310, the idle gear rotates clockwise by itself and also revolves forward following the circular arc shape of the fixed gear 320. As a result, as shown in FIG. 7(B)-(J) and FIG. 9, the arm 330 on which the idle gear 350 is mounted also rotates in the direction of tilting forward.

On the other hand, because the idle gear 350 is also engaged with the panel gear 340 that is fixed to the panel 100, the panel gear 340 rotates counterclockwise following the above-described rotation and revolution. Therefore, the panel 100 to which the panel gear 340 is fixed also rotates counterclockwise so as to tilt backward. Thus, because the arm 330 rotates so as to tilt forward and the panel 100 rotates so as to tilt backward, the display device 101 located on the front surface of the panel 100 tilts in the oblique direction, while facing forward.

Figure 10:
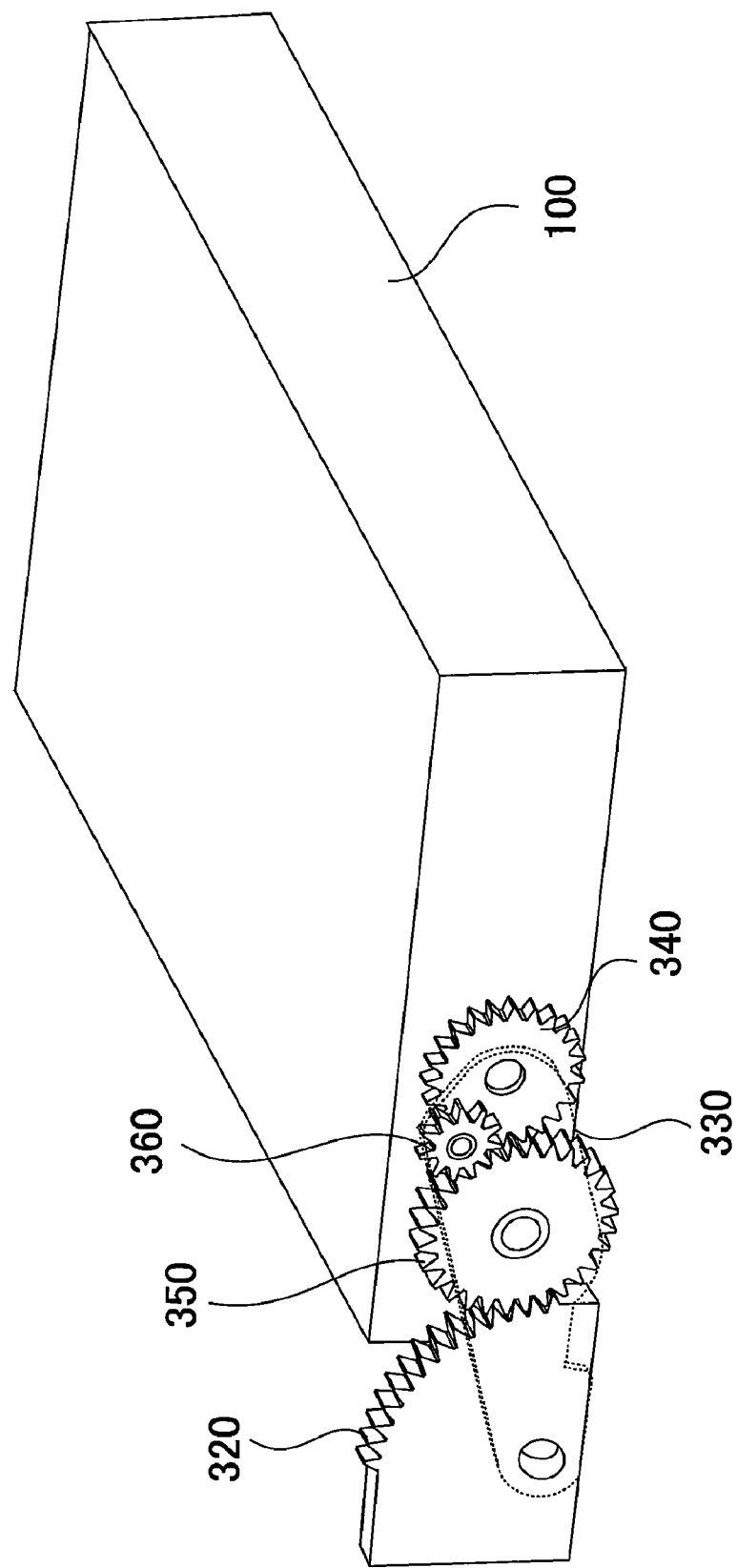
FIG. 10 is a perspective view illustrating the horizontal state of the panel in the embodiment shown in FIG. 1.

At this time, as shown in FIG. 1 and FIG. 3, the joining gear unit 260 rotates the gear section 251 of the rotation end detection unit 250, and the protruding piece 251a of the gear section separates from one switch 252b and moves toward the other switch 252a. If the protruding piece 251a comes into contact with the other switch 252b, the rotation end is detected and the control unit stops the motor 210. As a result, as shown in FIG. 7(K) and FIG. 10, the panel 100 is stopped in the horizontally tilted state and the insertion slot provided at the front surface of the body 400 is exposed. Therefore, the user can insert or remove a recording medium.

2. Operation of Returning Panel to Upright State

Figure 9:
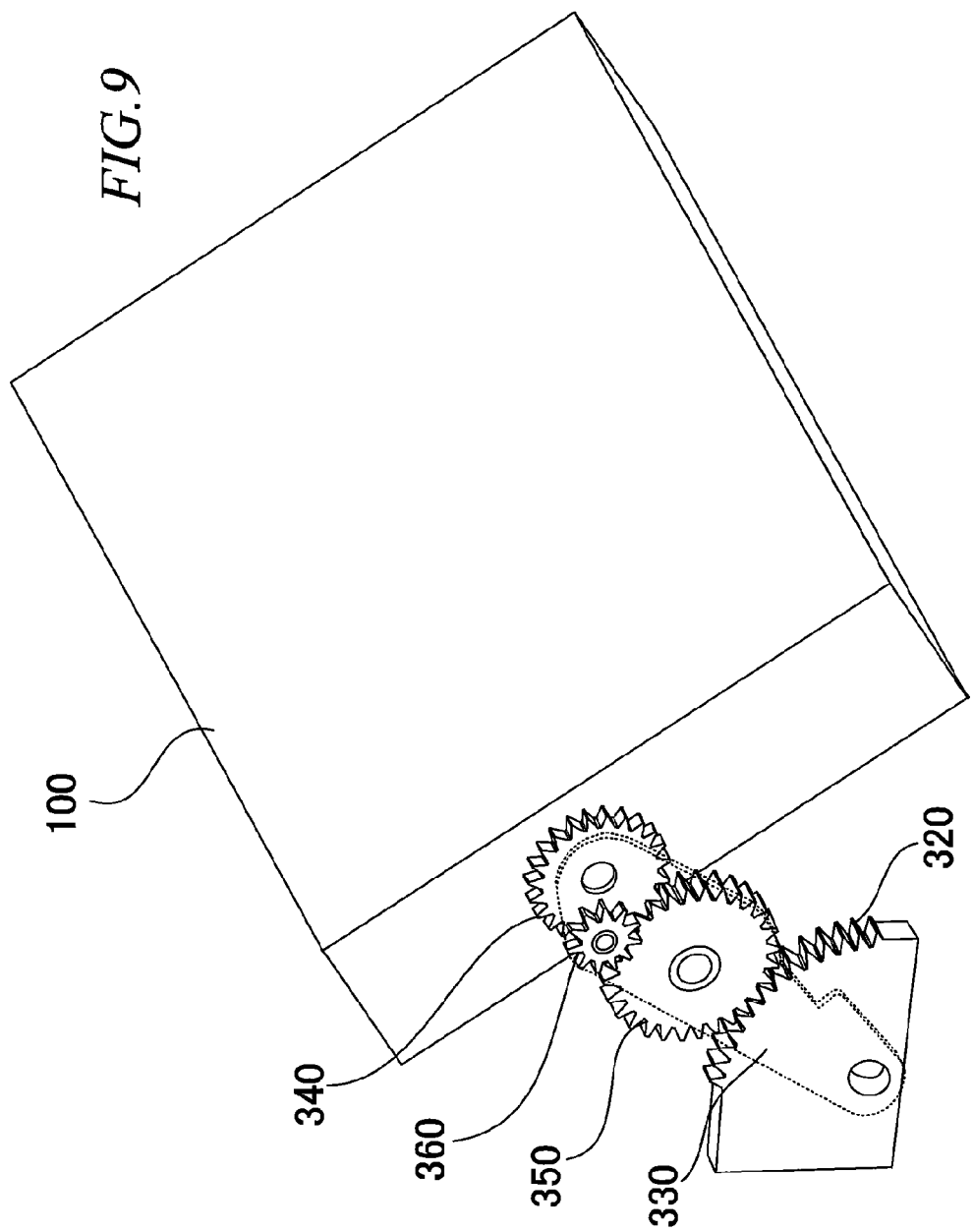
FIG. 9 is a perspective view illustrating the inclined state of the panel in the embodiment shown in FIG. 1.

When the tilted panel 100 is returned to the initial state, the user manipulates the input means, actuates the motor 210, and rotates the clutch 220 in the direction opposite to the above-described direction. As a result, the multistage gear 230 also rotates and the joining gear unit 260 rotates counterclockwise. As a result, the idle gear 350 starts rotating counterclockwise via the left-end gear 263 and transmission gear 360 and revolves backward along the circular arc of the fixed gear 320. For this reason, as shown in FIG. 7(J)-(B), FIG. 9, the arm 330 having the idle gear 350 mounted thereon also rotates in the direction of rising backward.

On the other hand, the idle gear 350 rotates the panel gear 340 clockwise following the above-described rotation and revolution. As a result, the panel 100 to which the panel gear 340 is fixed rotates clockwise so as to rise forward. Because the arm 330 thus rotates so as rise backward and the panel 100 rotates so as to rise forward, the display device 101 located at the front surface of the panel 100 rises to a state of facing forward.

At this time, the protruding piece 251a of the gear section 251 of the rotation end detection unit 250 moves in the reversed direction, that is, separates from one switch 252a and moves toward the other switch 252b. If the protruding piece 251a comes into contact with the other switch 252b, the rotation end is detected and the control unit stops the motor 210. As a result, as shown in FIG. 7(A) and FIG. 8, the panel 100 is raised vertically and the insertion slot provided at the front surface of the body 400 is covered.

3. Angle Adjustment of the Panel

In the explanation above, an example was shown in which the panel 100 was shifted between two states: an upright state and an inclined state, but the panel can be also stopped at different angles between these two states (for example, in any position shown in FIGS. 7(B)-(J)). Thus, at the time of the above-described actuation, the joining gear unit 260 also causes the rotation of the disk section 242 of the angle detection unit 240, and the amount of rotation can be detected by detecting the reflection sections 242a of the disk section 242 that pass by the sensor 243 and counting the number of the reflection sections 242a that have passed by with the control unit. Therefore, the panel 100 can be stopped at the desired angle by setting in advance the count number corresponding to this desired angle.

4. Safety Mechanism

When a user touches the rotating panel 100, a force stopping the rotation of gears is applied. At this time, because the slide gear 222 can rotate independently from the reel unit 221 even if the reel unit 221 stops, the rotation of the motor 210 is not stopped. In other words, in this case, the transmission of the drive force from the motor 210 to the joining gear unit 260 is disconnected. Therefore, no load is applied to the motor 210 and the gear grooves and the like are not deteriorated by the application of an unnecessary force. In particular, because the spacer 222b having lubricating properties is introduced between the reel unit 221 and slide gear 222, the sliding is smooth even if an impelling force of the spring 223 is applied.

D. Effect

With the above-described embodiment, the panel 100 can be driven only by the drive mechanism 200 and angle adjustment mechanism 300 incorporated at the rear section and on the left and right sides of the panel 100. Therefore, no special mechanism is necessary for the device 400. As a result, the internal space of the device 400 can be used effectively and the entire electronic device can be miniaturized.

In particular, because gear portions in the drive mechanism 200 that can easily have a large diameter to demonstrate effectively the respective functions or to obtain a speed reduction function, such as the clutch 220, multistage gear 230, angle detection unit 240, and rotation end detection unit 250, are all arranged in the direction parallel to the display surface of the display device 101 (direction perpendicular to the shaft) and also because the members comprising a comparatively long shaft, such as the motor 210 and joining gear section 260, are arranged so that the shaft thereof is parallel to the display surface of the display device 101, the thin space in the rear section of the panel 100 can be used effectively and a large number of functions can be included. Therefore, a thin shape of the panel 100 can be maintained and the entire electronic device onto which the panel 100 is mounted can be miniaturized.

Because all the mechanisms in the panel 100 are integrated, the panel 100 can be mounted on the body 400 by mounting the mounting plate 310 on the body 400. For this reason, the mechanism located inside the body 400 is joined or connected effortlessly. Therefore, the manufacturing process is greatly simplified, the production efficiency and quality are increased, and cost is reduced.

Further, because the angle adjustment mechanism 300 is provided on the left and right sides, a stable smooth operation can be realized. In addition, the angle of panel 100 can be automatically controlled by the angle adjustment unit 240 and control device according to the type of the device on which the panel will be mounted or as desired by the user. Moreover, because safety is ensured by the clutch 220 even if the user touches the panel 100 during rotation, an accident can be prevented and service life of the panel can be extended.

E. Other Embodiments

The present invention is not limited to the above-described embodiments. For example, the drive mechanism for driving the angle adjustment mechanism may be another mechanism that is capable of rotating the idle gear, rather than the mechanism explained by way of an example in the above-described embodiment. Furthermore, the mechanism driven by the drive mechanism may be another mechanism that displaces the panel, rather than the angle adjustment mechanism explained by way of an example in the above-described embodiment. By connecting (for example, by engaging the above-described left end gear 263) the drive mechanism to a rack (whether linear or curved) provided on the outside, a structure can be obtained in which the panel is moved along the rack. It goes without saying that a structure is also possible in which the panel is simply rotated about the joining gear unit as a shaft or by a speed reduction mechanism connected thereto. In those cases, the mechanism provided on the outside can be reduced in size and simplified.

Figure 11:
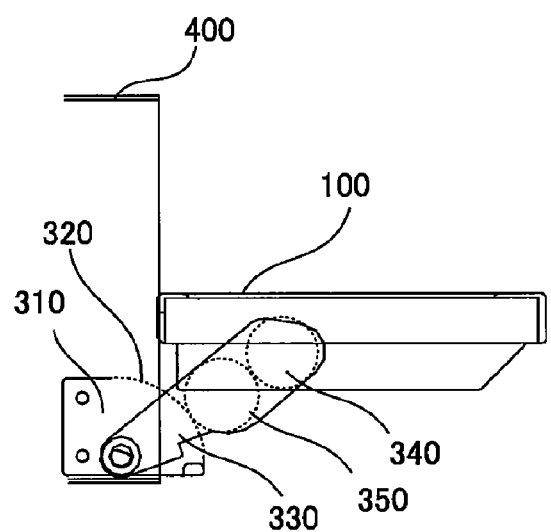
FIG. 11 is a side view illustrating another embodiment of the panel drive apparatus in accordance with the present invention.
Figure 12:
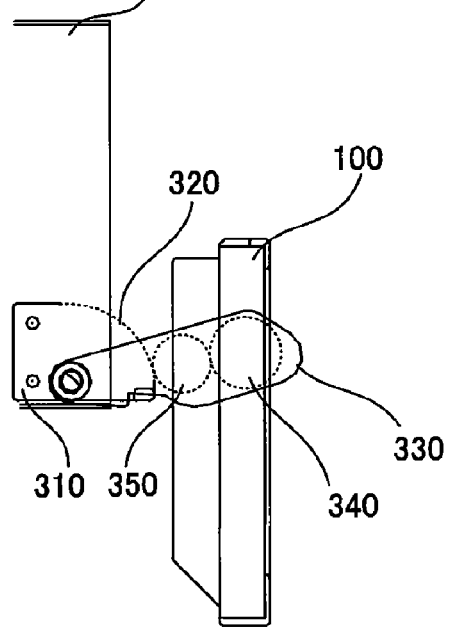
FIG. 12 is a side view illustrating another embodiment of the panel drive apparatus in accordance with the present invention.

Further, no specific limitation is placed on setting the gear ratio of the fixed gear, idle gear, and panel gear. Therefore, a variety of forms and types of panel drive can be realized by changing the gear ratio of those gears. For example, configurations can be used in which, as shown in FIG. 11, the panel 100 is horizontal in the central section of the body 400 in the height direction thereof, or as shown in FIG. 12, the panel 100 is vertical when the front surface of the body 400 is exposed. The display surface of the display device 100 in the panel 100 can be also moved reversibly.

In the above-described embodiment, a configuration was employed in which the panel was rotated up and down about the horizontal shaft, but a configuration with a left-right rotation with the vertical shaft is also possible. The hiding position of the panel from the front surface of the device in the above-described embodiment was below the front surface of the device, but the panel may be also hidden above, and when the shaft is vertical, the panel may be hidden on the left or right side. Furthermore, the gear group of the angle adjustment mechanism may be provided only on the left side or right side of the panel, rather than on both sides thereof, and the gear group may be provided only above and below, rather than both above and below. The arrangement positions and arrangement directions of the drive mechanism and angle adjustment mechanism and the number of gears constituting these mechanisms and the arrangement directions of gears can be set at random, provided that the operation effect of the present invention is produced.

A variety of input and output means such as display devices, switches, sensors, microphones, speakers, and cameras can be considered as members to be provided on the panel and no specific limitation is placed thereon. Any type of such input/output device that can be used at present or in the future can be applied. Furthermore, the present invention is suitable for the electronic devices for vehicles, but not limited thereto, and can be widely applied to other electric and electronic devices equipped with a panel. Therefore, the present invention is applicable to devices of various types, including stationary and portable devices.

The invention claimed is:

1. A display panel drive apparatus for movably mounting a display panel for an electronic device in a vehicle cabin, comprising:
    a mounting unit that can be mounted on the electronic device, positioned in the vehicle cabin,
    a display panel, with a display side having a display device providing information to a driver of the vehicle on a front surface of the display panel, the display panel is displaceably moved with respect to said mounting unit,
    an electrical drive unit is mounted on a rear surface of the display panel to move said display panel relative to the electronic device to enable access to the electronic device by a user in the vehicle cabin, wherein
    one end of an arm section is rotatably joined to said mounting unit,
    the other end of said arm section is rotatably joined to said display panel,
    said display panel is supported only by the joined section of said other end of said arm section and said display panel,
    said mounting unit comprises a fixed gear having at least a circular-arc gear section mounted to be stationary on the mounting unit,
    a panel gear having at least a circular-arc gear section, mounted to be stationary, is fixed to said display panel, the circular-arc gear section is fixed coaxially to the rotation axis of the joined section of said other end of said arm section and said display panel and rotatable in conjunction with said display panel,
    said arm section has a rotatable idle gear which is provided between said fixed gear and said panel gear so as to be engaged with the respective fixed gear and the panel gear and which is rotated by said electrical drive unit,
    said display panel is displaceably between a position where said display panel covers the front surface of said electrical drive unit relative to the user and another position where said display panel moves to the lower end of said electrical drive unit to expose the front surface of said electrical drive unit to the user, the electrical drive unit is mounted on the rear side of the display side of said display panel so as to be displaceable together with the display panel as the arm section is driven by the electrical drive unit to rotate the idle gear.

2. The display panel drive apparatus according to claim 1, wherein
    arm section, said fixed gear, said panel gear, and said idle gear are provided in pairs on said display panel.

3. The display panel drive apparatus according to claim 2, wherein said electrical drive unit comprises:
    a drive source;
    detection means for detecting at least one of a displacement amount or a displacement end of said display panel; and
    a control unit for controlling said drive source according to a detection signal of said detection means.

4. The display panel drive apparatus according to claim 2, wherein said electrical drive unit comprises:
    a drive source;
    a joining gear unit that transmits a drive force of said electrical drive unit to said idle gear; and
    a clutch mechanism that is provided between said drive source and said joining gear unit, transmits the drive force of said drive source to said joining gear unit, and disconnects the transmission of the drive force from said drive source to said joining gear unit when a force acting against the drive force is applied to said joining gear unit.

5. The display panel drive apparatus according to claim 1, wherein said electrical drive unit comprises:
    a drive source;
    detection means for detecting at least one of a displacement amount or a displacement end of said display panel; and
    a control unit for controlling said drive source according to a detection signal of said detection means.

6. The display panel drive apparatus according to claim 5, wherein said electrical drive unit comprises:
- a drive source;
- a joining gear unit that transmits a drive force of said electrical drive unit to said idle gear; and
- a clutch mechanism that is provided between said drive source and said joining gear unit, transmits the drive force of said drive source to said joining gear unit, and disconnects the transmission of the drive force from said drive source to said joining gear unit when a force acting against the drive force is applied to said joining gear unit.

7. The display panel drive apparatus according to claim 1, wherein said electrical drive unit comprises:
- a drive source;
- a joining gear unit that transmits a drive force of said drive unit to said idle gear; and
- a clutch mechanism that is provided between said drive source and said joining gear unit, transmits the drive force of said drive source to said joining gear unit, and disconnects the transmission of the drive force from said drive source to said joining gear unit when a force acting against the drive force is applied to said joining gear unit.

8. The display panel drive apparatus according to claim 1, wherein said electrical drive unit has a drive mechanism comprising a drive source and a plurality of gears driven by said drive source, said drive mechanism is incorporated at the rear surface side of the display device in said dislay panel, said plurality of gears include a position detection gear for detecting the rotation amount or rotation end thereof and a clutch mechanism gear for connecting and disconnecting the drive force of said drive source, and large-diameter sections of said position detection gear and said clutch mechanism gear are arranged parallel to the display surface of the display device.

9. The display panel drive apparatus according to claim 8, further comprising a joining gear unit for transmitting a drive force between any of said drive source, said position detection gear, and said clutch mechanism gear; and a shaft of said joining gear unit is arranged parallel to the display surface of the display device.

10. The display panel drive apparatus according to claim 9, further comprising an angle adjustment mechanism having a plurality of gears driven by said drive mechanism and a mounting unit that can be mounted on a device.

11. The display panel drive apparatus according to claim 8, further comprising an angle adjustment mechanism having a plurality of gears driven by said drive mechanism and a mounting unit that can be mounted on a device.

12. The display panel drive apparatus according to claim 1, wherein a drive mechanism is mounted on a rear surface side of the display panel, with a plurality of gears that include a position detection gear for detecting the rotation amount or rotation end thereof and a clutch mechanism gear for connecting and disconnecting the drive force of said electrical drive unit, and large-diameter sections of said position detection gear and said clutch mechanism gear are arranged parallel to the display surface of the display device.

13. The display panel drive apparatus according to claim 12, further comprising a joining gear unit for transmitting a drive force between said electrical drive unit, said position detection gear, and said clutch mechanism gear and a shaft of said joining gear unit is arranged parallel to the display surface of the display device.

14. The display panel drive apparatus according to claim 13, further comprising an angle adjustment mechanism having a plurality of gears driven by said drive mechanism and a mounting unit that can be mounted on the electronic device.

15. The display panel drive apparatus according to claim 1, wherein a spring member, connected to said arm section, bias the display panel to a position to cover a portion of the electronic device.

16. The display panel drive apparatus according to claim 1, where the display side of the display device substantially extends across the front surface of the display panel.

17. The display panel drive apparatus according to claim 16 wherein the electrical drive unit is mounted on the rear surface of the display panel with a drive motor located within an extension of a perimeter of the display device from the front surface.

18. The display panel drive apparatus according to claim 17 wherein the display device is a liquid crystal display.

* * * * *